United States Patent [19]

Yokota et al.

[11] Patent Number: 4,604,565
[45] Date of Patent: Aug. 5, 1986

[54] MICROCOMPUTER-CONTROLLED DC THREE-WIRE CIRCUIT FOR VEHICLE

[75] Inventors: Mitsuyoshi Yokota; Akio Matsumoto; Mitsuharu Morishita, all of Hyogo, Japan

[73] Assignee: Mitsubishi Denki Kabushiki Kaisha, Hyogo, Japan

[21] Appl. No.: 496,711

[22] Filed: May 20, 1983

[30] Foreign Application Priority Data

May 20, 1982 [JP] Japan .................................. 57-87092

[51] Int. Cl.$^4$ .............................................. H02J 7/14
[52] U.S. Cl. .................................. 320/15; 290/37 A; 307/84; 320/64; 322/29; 322/90; 322/99
[58] Field of Search ...................... 322/28, 89, 90, 99, 322/29; 320/64, 68, 35, 39, 15, 16; 290/16, 18, 36 A, 37 R, 37 A, 31, 33, 38 C, 46, 50; 123/179 B; 307/84

[56] References Cited

U.S. PATENT DOCUMENTS

| 3,720,839 | 3/1973 | Spahr | 290/37 R |
| 4,156,836 | 5/1979 | Wiley | 322/90 X |
| 4,209,816 | 6/1980 | Hansen | 290/3.7 A X |
| 4,308,492 | 12/1981 | Mori et al. | 320/35 X |
| 4,336,485 | 6/1982 | Stroud | 322/90 X |
| 4,347,473 | 8/1982 | Stroud | 322/90 X |
| 4,379,990 | 4/1983 | Sievers et al. | 322/99 |
| 4,482,812 | 11/1984 | Hori et al. | 290/37.12 X |

Primary Examiner—R. J. Hickey
Attorney, Agent, or Firm—Sughrue, Mion, Zinn, Macpeak and Seas

[57] ABSTRACT

A D.C. charging and starter circuit for a vehicle includes a microcomputer which monitors the state of battery switch units, a pair of charging generators and a starter switch, and operates to control various switching elements and the like to prevent accidental discharge of the batteries, and to prevent damage to either the electrical load or the generator rectifier circuits.

7 Claims, 2 Drawing Figures

MICROCOMPUTER-CONTROLLED DC THREE-WIRE CIRCUIT FOR VEHICLE

BACKGROUND OF THE INVENTION

This invention relates to a DC three-wire circuit for a vehicle, which includes a starter motor for starting an internal combustion engine installed on the vehicle; in which the batteries are charged by charging generators driven by the internal combustion engine; and in which the rectifiers of the charging generators and the starter motor are protected from damage while the batteries are maintained charged.

In a proposed DC three-wire circuit of this type, the protection of the rectifiers in the charging generators from damage which may occur because of a defective contact of the battery switch; the protection of the starter motor from damage by automatically disconnecting it from the battery when the speed of the engine reaches a predetermined value, and the prevention of the discharge of the batteries which may occur when the key switches remain turned on after the engine stops, are carried out by electromagnetic relays, namely, a battery relay, a starter safety relay and a field relay, respectively.

However, this system is disadvantageous in that the external connection is intricate and a relatively large space is required for installation.

SUMMARY OF THE INVENTION

Accordingly, an object of this invention is to provide a microcomputer-operated DC three-wire circuit for a vehicle, in which the above-described difficulties have been eliminated.

DETAILED DESCRIPTION OF THE PREFERRED EMBODIMENTS

Figure 1:
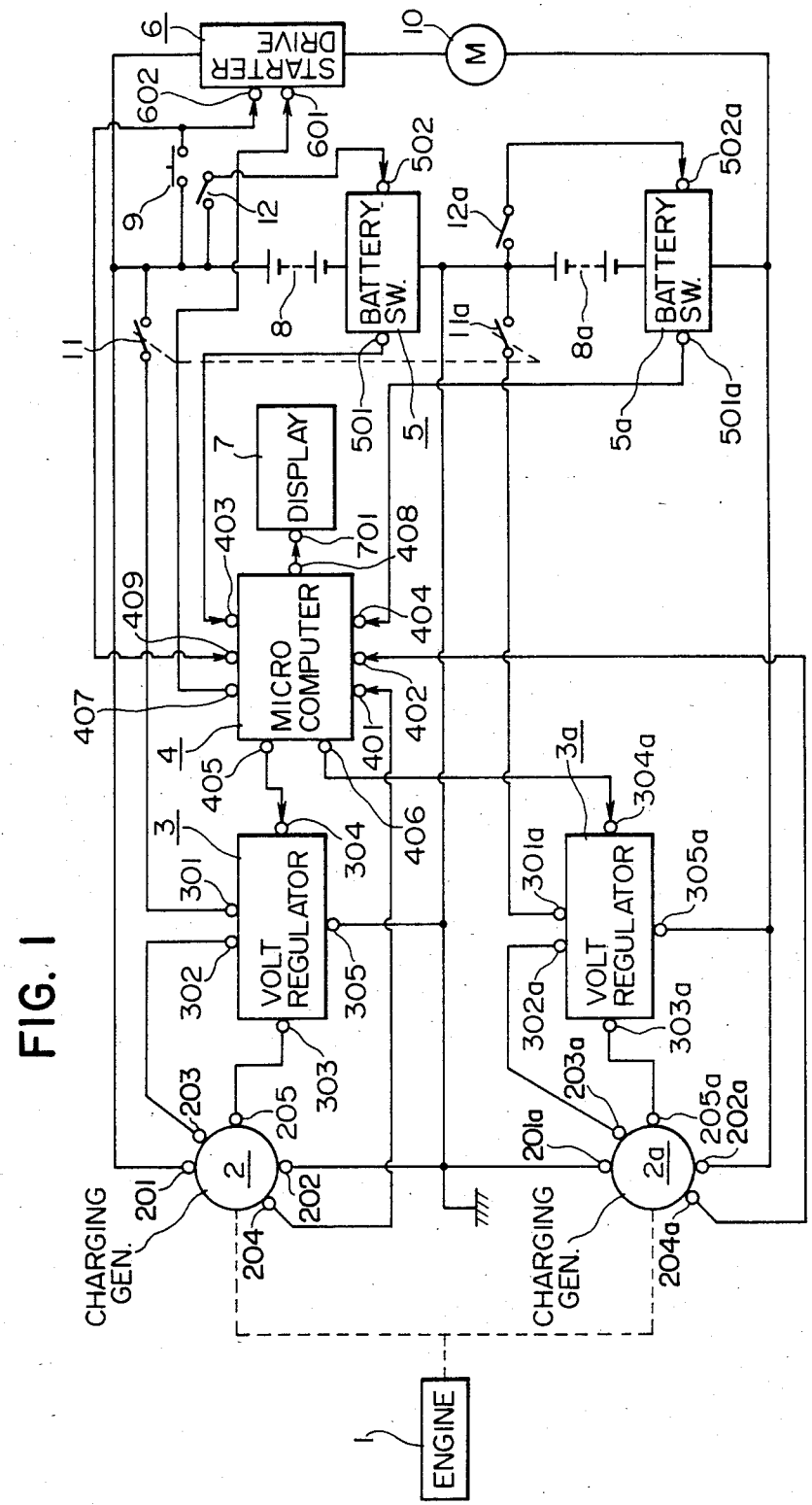
FIG. 1 in the accompanying drawing is a circuit diagram showing one embodiment of this invention.

One embodiment of this invention will now be described with reference to the accompanying drawing.

In the single figure in the accompanying drawing, reference numeral 241 designates an internal combustion engine installed on a vehicle or the like; 2, a first charging generator having a rectifier, which is driven by the engine 1; 2a, a second charging generator also having a rectifier, which is driven together with the first charging generator 2 by the engine 1; 201 and 201a, positive (+) main rectifier output terminals of the generators 2 and 2a; 202 and 202a, negative (−) rectifier output terminals of the generators 2 and 2a; 203 and 203a, positive auxiliary rectifier output terminals of the generators; 204 and 204a, third positive (+) output terminals of the generators; 205 and 205a, field coil output terminals of the generators; 3 and 3a, first and second voltage regulators which detect voltages generated by the first and second generators 2 and 2a to control the field currents in the field coils to thereby control the output voltages of the charging generators 2 and 2a to first and second values, respectively; 301 and 301a, initial excitation terminals of the regulators 3 and 3a; 302 and 302a, voltage detection terminals of the regulators; 303 and 303a, field coil input terminals; 304 and 304a, external control terminals for receiving data from a microcomputer 4 (described later) to control the set (reference) values of voltage regulators 3 and 3a; and 305 and 305a, negative (−) terminals which are connected respectively to the negative rectifier output terminals 202 and 202a of the generators 2 and 2a.

Further in the figure, reference numeral 4 designates the aforementioned microcomputer, which is provided with input terminals 401 and 402 for receiving output signals from the positive (+) output terminals 204 and 204a of the charging generators 2 and 2a, respectively, input terminals 403 and 404 for receiving signals representative of the on-off states of first and second battery switch units 5 and 5a (described later), output terminals 405 and 406 connected to the external control terminals 304 and 304a of the first and second voltage regulators respectively, an output terminal 407 connected to a starter motor drive device 6 (described later), an output terminal 408 connected to the input terminal 701 of a display unit 7, and an input terminal 409 for receiving an output signal from a starter switch 9.

Further in the figure, reference characters 5 and 5a designate the aforementioned battery switch units, the battery switch unit 5 being connected through a first battery 8 between the positive (+) main rectifier output terminal 201 and the negative (−) rectifier output terminal 202 of the generator 2, and the switch unit 5a being connected through a second battery 8a between the positive (+) main rectifier output terminal 201a and the negative (−) rectifier output terminal 202a of the generator 2a; 501 and 501a, the output terminals of the battery switch units 5 and 5a, which are connected to the microcomputer 4; 502 and 502a, input terminals for receiving output signals from battery switches 12 and 12a; 6, the aforementioned starter motor drive device, which has an input terminal 601 for receiving an output signal from the microcomputer 4 and an input terminal 602 for receiving an output signal from the starter switch 9; 10, a starter motor connected through the starter motor drive device 6 between the positive main rectifier output terminal 201 of the first charging generator 2 and the negative (−) rectifier output terminal of the second charging generator 2a; 11 and 11a, key switches operated in association with one another; and 12 and 12a, the aforementioned battery switches.

Figure 2:
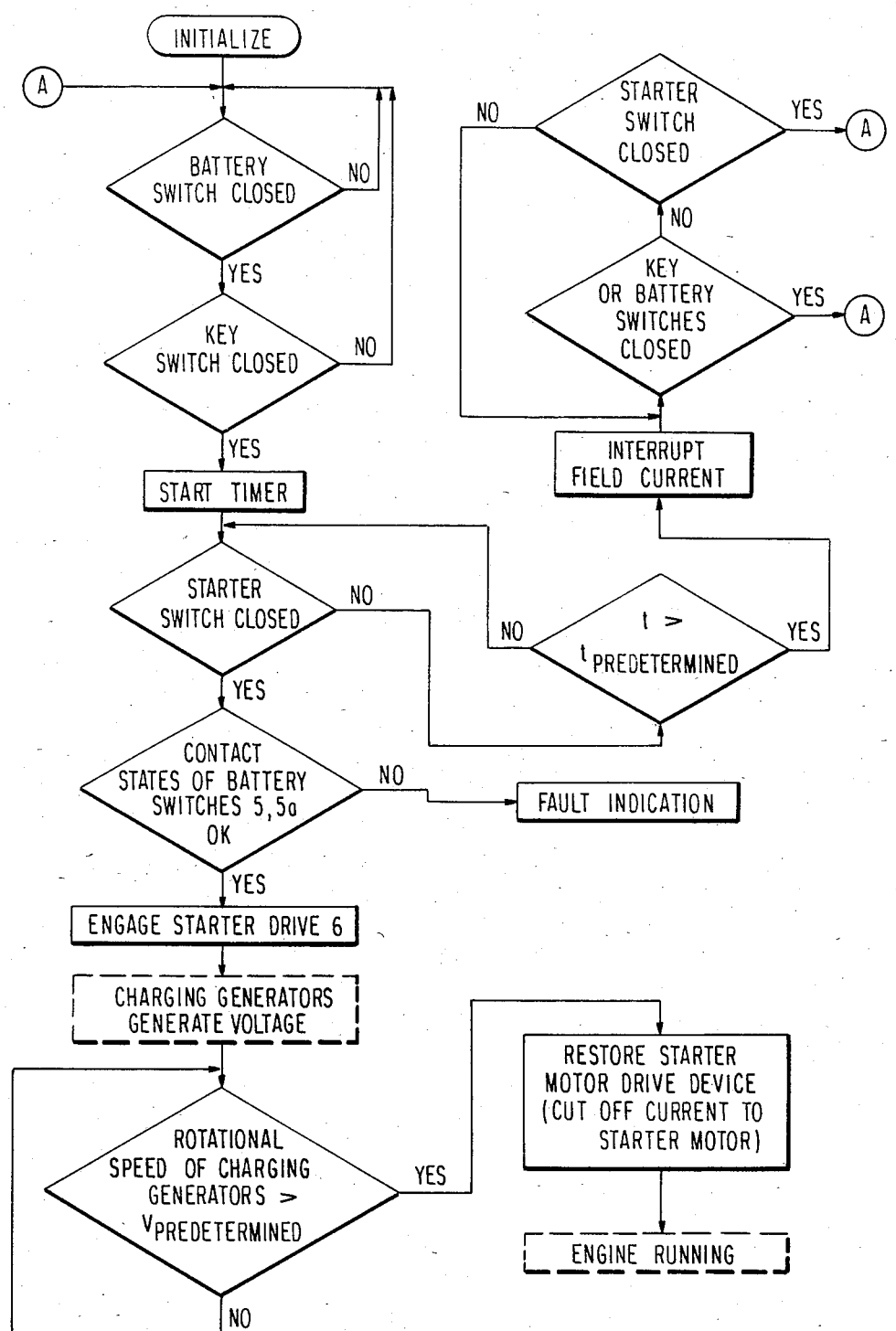
FIG. 2 is a functional flow chart which diagrammatically illustrates the operation of the embodiment of FIG. 1.

The operation of the device thus organized will now be described referring both to apparatus, FIG. 1; and the functional blocks of the flow chart, FIG. 2.

When the battery switches 12 and 12a and the key switches 11 and 11a are closed, an initial field current flows in the field coil of the charging generator 2 connected between the positive (+) auxiliary rectifier output terminal 203 and the field coil output terminal 205 through the key switch 11, the initial excitation terminal 301, the battery detection terminal 302, the voltage regulator 3 and the battery switch unit 5, from the battery 8 and a field magnetomotive force is generated therein, while, similarly, an initial field current flows in the field coil of the charging generator 2a connected between the positive (+) auxiliary rectifier output terminal 203a and the field coil output terminal 205a through the key switch 11a, the initial excitation terminal 301a, the battery detection terminal 302a the voltage regulator 3a and the battery switch unit 5a, from the battery 8a, and a field magnetomotive force is generated therein as well. When, in this condition, the starter switch 9 is not closed within a predetermined period of time, the microcomputer 4 applies signals through the output terminals 405 and 406 to the external output terminals 304 and 304a of the voltage regulators 3 and 3a respectively, as a result of which the initial field currents are interrupted and the batteries 8 and 8a are prevented from being unduly discharged. This condition is maintained unchanged until the battery switches 12 and 12a or the key switches 11 and 11a are opened or the starter switch 9 is closed.

When the starter switch 9 is closed within the predetermined period of time to energize the starter motor 10 through the starter motor drive device 6 to thereby drive the engine 1, the charging generators 2 and 2a generate voltages which are applied to the third output terminals 204 and 204a, respectively. In this case, the field currents are supplied through the positive (+) auxiliary rectifier output terminals 203 and 203a.

In this condition, no signals are provided at the output terminals 405 and 406, and accordingly no signals are applied to the external control terminals 304 and 304a. If, in this condition, the starter switch 9 is kept closed and the speeds of rotation of the charging generators 2 and 2a become higher than predetermined values, the microcomputer 4 provides an output signal at the output terminal 407, so as to restore the starter motor drive device 6 to stop the application of current to the starter motor 10, thus preventing the starter motor 10 from being rotated at high speed until damaged.

The voltage generated by the charging generators 2 and 2a are provided at the positive (+) auxiliary rectifier output terminals 203 and 203a also. These voltages are detected at the voltage detection terminals 302 and 302a of the voltage regulators 3 and 3a, so as to be controlled to the predetermined values, respectively.

Let us consider the case where the contact resistance of the first or second battery switch unit 5 or 5a is high in operating the starter motor. If, under the condition that the second battery switch unit 5a is not conductive because of a defective contact, the starter switch 9 is closed and the starter motor drive device 6 is closed, the current for the motor 10 flows in a loop circuit which is made up of the first battery 8, the starter motor drive device 6, the starter motor 10, the negative (−) rectifier output terminal 202a of the second charging generator 2a, the positive (+) main rectifier output terminal 201a of the second charging generator 2a, and the first battery switch unit 5. Therefore, a problem in that damage to the rectifier in the second charging generator may occur is created. However, output signals representative of the contact states of the battery switch units 5 and 5a are applied through the output terminals 501 and 501a to the input terminals 403 and 404 of the microcomputer 4 and the output signal provided at the output terminal 407 of the microcomputer 4 is applied to the input terminal 601 of the starter motor drive device 6, so that the starter motor drive device is not closed even when the starter switch 9 is closed. Thus, the rectifier can be prevented from being damaged. Data respecting the above-described problem may be displayed on the display unit 7.

In the above-described embodiment, the third output signals of the first and second charging generators are applied to the microcomputer; however, the same effect can be obtained by applying an r.p.m. signal from the engine thereto. In addition, the device of the invention is effective in the case where a load having a large surge current, such as a motor other than a starter motor, is connected.

As is apparent from the above description, in the device of the invention, which has two charging generators, two voltage regulators and two batteries, and a load such as starter motor connected between the positive (+) main rectifier output terminal of the first charging generator and the negative rectifier output terminal of the second charging generator; the microcomputer, receiving the output signals from the first and second charging generators, the output signals from the first and second battery switch units and the output signal of the starter switch; applies data to the first and second voltage regulators and the starter motor drive device, to protect the charging generator rectifiers and the starter motor, and prevents the discharge of the batteries, and faults or problems in the system are displayed on the display unit. Thus, the device of the invention is high in reliability.

What is claimed is:

1. A microcomputer-controlled DC three-wire circuit for a vehicle, comprising; first and second charging generators driven by an engine of said vehicle and magnetically separated from one another, and each having a rectifier; a first voltage regulator for detecting an output voltage of said first charging generator, and for controlling said output voltage to a first predetermined value; a second voltage regulator for detecting an output voltage of said second charging generator, and for controlling said output voltage to a second predetermined value; a first battery switch unit, a first battery connected through said first battery switch unit between a pair of terminals of said first charging generator; a starter switch electrically connected to at least said first battery; a second battery switch unit, a second battery connected through said second battery switch unit between a pair of terminals of said second charging generator; and an electric load connected between a positive terminal of one of said charging generators and a negative terminal of the other of said charging generators, and means including a microcomputer which receives data on the on-off states of said first and second battery switch units, one of (a) first and second engine-speed related output signals of said first and second charging generators, respectively, or, (b) rotation signal data from said engine, and an output signal of said starter switch, for protecting said rectifiers in said first and second charging generators and said load and for preventing undue discharging of said first and second batteries.

2. An apparatus as claimed in claim 1, wherein said first charging generator terminal pair comprise a positive main rectifier output terminal and a negative rectifier output terminal thereof, and said second charging generator terminal pair comprise a positive main rectifier output terminal and a negative rectifier output terminal thereof, the negative rectifier output terminal of the first charging generator being connected to the positive main rectifier output terminal of the second charging generator.

3. An apparatus as claimed in claim 1, said electric load comprising at least an electric motor connected between a positive main rectifier output terminal of the first charging generator and a negative rectifier output terminal of the second charging generator.

4. An apparatus as claimed in claim 1, said first and second batteries each being provided with a key switch and a battery switch, said microcomputer controlling said first and second voltage regulators to prevent discharge of said batteries when said key switches and said battery switches are closed and said starter switch remains open for a predetermined period of time.

5. An apparatus as claimed in claim 1, including a starter motor drive device coupled to said starter switch, said microcomputer controlling said starter motor drive device so as to suspend the application of current to said starter motor upon the rotational speeds of said charging generators exceeding a predetermined value.

6. An apparatus as claimed in claim 1, further including display means driven by said microcomputer for displaying detection data.

7. An apparatus as claimed in claim 1, further including a starter motor drive device coupled to said starter switch, said microcomputer controlling said starter motor drive device so as to open the same upon detecting a fault in at least one of said battery switch units when said starter switch is closed.

* * * * *